(12) United States Patent
Salazar-Guillen et al.

(10) Patent No.: US 8,586,515 B2
(45) Date of Patent: Nov. 19, 2013

(54) METHOD FOR MAKING BIOFUELS AND BIOLUBRICANTS

(75) Inventors: Jose Armando Salazar-Guillen, Reno, NV (US); Mahendra Joshi, Katy, TX (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 370 days.

(21) Appl. No.: 12/911,409

(22) Filed: Oct. 25, 2010

(65) Prior Publication Data
US 2012/0101014 A1    Apr. 26, 2012

(51) Int. Cl.
C10M 173/02   (2006.01)
C10L 1/00   (2006.01)
C07C 1/00   (2006.01)

(52) U.S. Cl.
USPC ............................. 508/216; 44/307; 585/240

(58) Field of Classification Search
USPC .............................. 508/216; 44/307; 585/240
See application file for complete search history.

(56) References Cited

U.S. PATENT DOCUMENTS

| | | | |
|---|---|---|---|
| 2,658,861 A | 11/1953 | Pevere et al. | |
| 2,871,180 A | 1/1959 | Lowman et al. | |
| 3,079,327 A | 2/1963 | Keith et al. | |
| 3,131,141 A | 4/1964 | West | |
| 3,389,075 A | 6/1968 | Addison | |
| 3,527,692 A | 9/1970 | Titus | |
| 3,565,593 A | 2/1971 | Moore | |
| 3,565,594 A | 2/1971 | Moore et al. | |
| 3,565,968 A | 2/1971 | Moore | |
| 3,692,859 A | 9/1972 | Cottle | |
| 3,779,902 A | 12/1973 | Mitchell et al. | |
| 3,951,778 A | 4/1976 | Willard, Sr. | |
| 4,035,282 A | 7/1977 | Stuchberry et al. | |
| 4,046,668 A | 9/1977 | Farcasiu et al. | |
| 4,120,777 A | 10/1978 | Globus | |
| 4,139,450 A | 2/1979 | Hanson et al. | |
| 4,308,133 A | 12/1981 | Meyer | |
| 4,320,091 A | 3/1982 | Irvin | |
| 4,347,118 A | 8/1982 | Funk et al. | |
| 4,427,537 A | 1/1984 | Dean et al. | |

(Continued)

FOREIGN PATENT DOCUMENTS

| | | |
|---|---|---|
| CA | 2224615 | 6/1999 |
| JP | 2005307104 | 11/2005 |
| WO | WO 2007/102819 | 9/2007 |

OTHER PUBLICATIONS

International Search Report, PCT/US2012/033013, Oct. 31, 2012 (5 pp.).

(Continued)

*Primary Examiner* — Cephia D Toomer
*Assistant Examiner* — Vishal Vasisth
(74) *Attorney, Agent, or Firm* — Jack E. Ebel; Corey S. Tumey; Rodney F. Brown (57) ABSTRACT

A process for producing biofuels and biolubricants from lipid material includes reacting lipid material with a motive fluid in a reactor. The reactor may be configured to cause a high energy collision between the motive fluid and the lipid material that facilitates the reactions that result in biofuels and biolubricants. A heavy fraction of the effluent may be repeatedly recycled back through the reactor until most, if not all, of the lipid material has been converted.

14 Claims, 5 Drawing Sheets

(56) References Cited

U.S. PATENT DOCUMENTS

| | | |
|---|---|---|
| 4,490,259 A | 12/1984 | Coffing |
| 4,589,980 A | 5/1986 | Keys |
| 4,596,651 A | 6/1986 | Wolff et al. |
| 4,612,113 A | 9/1986 | Kallioinen |
| 4,678,561 A | 7/1987 | Keys |
| 4,678,562 A | 7/1987 | Keys |
| 4,724,272 A | 2/1988 | Raniere et al. |
| 4,744,890 A | 5/1988 | Miller et al. |
| 4,859,317 A | 8/1989 | Shelfantook et al. |
| 4,900,454 A | 2/1990 | Hedlund et al. |
| 5,044,552 A | 9/1991 | Becker et al. |
| 5,108,583 A | 4/1992 | Keon |
| 5,143,598 A | 9/1992 | Graham et al. |
| 5,176,802 A | 1/1993 | Duyvesteyn et al. |
| 5,188,805 A | 2/1993 | Sabottke |
| 5,223,148 A | 6/1993 | Tipman et al. |
| 5,236,577 A | 8/1993 | Tipman et al. |
| 5,254,325 A | 10/1993 | Yamasaki et al. |
| 5,328,591 A | 7/1994 | Raterman |
| 5,389,274 A | 2/1995 | Fernandez |
| 5,443,158 A | 8/1995 | McKenny et al. |
| 5,464,503 A | 11/1995 | Avetisian et al. |
| 5,485,883 A | 1/1996 | Rippetoe et al. |
| 5,538,081 A | 7/1996 | Rippetoe et al. |
| 5,554,301 A | 9/1996 | Rippetoe et al. |
| 5,565,090 A | 10/1996 | Gosling et al. |
| 5,624,642 A | 4/1997 | Devanathan et al. |
| 5,626,743 A | 5/1997 | Humphreys |
| 5,670,056 A | 9/1997 | Yoon et al. |
| 5,673,859 A | 10/1997 | Haruch |
| 5,702,612 A | 12/1997 | Wang |
| 5,705,722 A | 1/1998 | Monnier et al. |
| 5,795,466 A | 8/1998 | Kelebek et al. |
| 5,798,137 A | 8/1998 | Lord et al. |
| 5,849,201 A | 12/1998 | Bradley |
| 5,876,592 A | 3/1999 | Tipman et al. |
| 5,896,435 A | 4/1999 | Gautier et al. |
| 5,961,786 A | 10/1999 | Freel et al. |
| 5,968,349 A | 10/1999 | Duyvesteyn et al. |
| 6,007,709 A | 12/1999 | Duyvesteyn et al. |
| 6,036,849 A | 3/2000 | Rippetoe et al. |
| 6,042,717 A | 3/2000 | Radcliffe et al. |
| 6,074,558 A | 6/2000 | Duyvesteyn et al. |
| 6,106,787 A | 8/2000 | Rippetoe et al. |
| 6,214,213 B1 | 4/2001 | Tipman et al. |
| 6,320,148 B1 | 11/2001 | Yoon et al. |
| 6,352,639 B2 | 3/2002 | Ito et al. |
| 6,427,843 B1 | 8/2002 | Clark |
| 6,514,310 B2 | 2/2003 | Allemand et al. |
| 6,589,417 B2 | 7/2003 | Taciuk et al. |
| 6,595,163 B2 | 7/2003 | Dumaz et al. |
| 6,667,348 B2 | 12/2003 | Chang et al. |
| 6,793,079 B2 | 9/2004 | Khan et al. |
| 6,821,500 B2 | 11/2004 | Fincke |
| 6,827,786 B2 | 12/2004 | Lord |
| 6,835,360 B2 | 12/2004 | Warren |
| 6,855,838 B2 | 2/2005 | Haas et al. |
| 6,871,743 B2 | 3/2005 | Yoon et al. |
| 6,887,283 B1 | 5/2005 | Ginosar et al. |
| 6,906,164 B2 | 6/2005 | DeBruin |
| 6,916,964 B2 | 7/2005 | Gobbel et al. |
| 6,936,227 B1 | 8/2005 | De Souza et al. |
| 6,989,091 B2 | 1/2006 | Jorgensen |
| 7,008,528 B2 | 3/2006 | Mitchell et al. |
| 7,011,749 B2 | 3/2006 | Hayes et al. |
| 7,018,435 B1 | 3/2006 | Wentinck |
| 7,097,675 B2 | 8/2006 | Detering et al. |
| 7,195,747 B2 | 3/2007 | Vanden Bussche et al. |
| 7,381,320 B2 | 6/2008 | Iqbal et al. |
| 7,384,557 B2 | 6/2008 | Phillips et al. |
| 7,585,407 B2 | 9/2009 | Duyvesteyn |
| 7,618,597 B2 | 11/2009 | Duyvesteyn et al. |
| 7,811,444 B2 | 10/2010 | Duyvesteyn et al. |
| 7,824,453 B2 | 11/2010 | Duyvesteyn |
| 7,888,542 B2 | 2/2011 | Koivusalmi et al. |
| 7,909,989 B2 | 3/2011 | Duyvesteyn et al. |
| 7,927,565 B2 | 4/2011 | Duyvesteyn et al. |
| 7,988,847 B2 | 8/2011 | Duyvesteyn et al. |
| 2003/0158074 A1* | 8/2003 | Haas et al. .......... 510/458 |
| 2005/0070218 A1 | 3/2005 | Phillips et al. |
| 2007/0170095 A1 | 7/2007 | Freel et al. |
| 2008/0156702 A1 | 7/2008 | Duyvesteyn |
| 2008/0210602 A1 | 9/2008 | Duyvesteyn |
| 2008/0242875 A1 | 10/2008 | Hong et al. |
| 2009/0145809 A1 | 6/2009 | Ledbetter et al. |
| 2009/0266741 A1* | 10/2009 | Duyvesteyn et al. ......... 208/128 |
| 2009/0294332 A1 | 12/2009 | Ryu |
| 2010/0059411 A1 | 3/2010 | Satchell, Jr. |
| 2010/0264062 A1 | 10/2010 | Duyvesteyn et al. |
| 2011/0017642 A1 | 1/2011 | Duyvesteyn et al. |
| 2011/0084000 A1 | 4/2011 | Duyvesteyn et al. |
| 2011/0180454 A1 | 7/2011 | Duyvesteyn et al. |
| 2011/0233114 A1 | 9/2011 | Duyvesteyn et al. |
| 2011/0308995 A1 | 12/2011 | Salazar-Guillen et al. |
| 2012/0267286 A1 | 10/2012 | Salazar-Guillen et al. |

OTHER PUBLICATIONS

Information about Related Patents and Patent Applications, see the section below having the same title.
U.S. Appl. No. 13/666,108, filed Nov. 1, 2012, Systems and Methods for Integrating Bitumen Extraction with Bitumen Upgrading.
U.S. Appl. No. 13/662,939, filed Oct. 29, 2012, Nozzle Reactor Systems and Methods of Use.
U.S. Appl. No. 13/652,132, filed Oct. 15, 2012, Methods and Systems for Upgrading Hydrocarbon.
U.S. Appl. No. 13/227,470, filed Sep. 7, 2011, Nozel Reactor and Method of Use.
Hong et al., "A Polar-Nonpolar, Acetic Acid/Heptane, Solvent Medium for Degradation of Pyrene by Ozone," Ind. Eng. Chem. Res. 43:7710-7715, 2004 (6 pp.).
Houdaille, "Jet Pump Technical Data—Pumping Liquids," pp. 1-11, 1982 (12 pp.).
Information about Related Patents and Patent Applications, see the section below having the same title, 2011.
International Search Report, PCT/US2005/34092, Jul. 26, 2007 (6 pp.).
International Search Report, PCT/US2006/08263, Oct. 23, 2006 (5 pp.).
International Search Report, PCT/US2005/36728, Aug. 8, 2005 (8 pp.).
International Search Report, PCT/US2010/31260, Jun. 9, 2010 (3 pp.).
International Search Report and Written Opinion, PCT/US2010/42327, Sep. 1, 2010 (9 pp.).
International Search Report, PCT/US2010/043093, Sep. 13, 2010 (3 pp.).
U.S. Appl. No. 13/292,747, filed Nov. 9, 2011, Heavy Hydrocarbon Reactor.
U.S. Appl. No. 13/227,470, filed Sep. 7, 2011, Nozzle Reactor and Method of Use.
International Search Report, PCT/US2011/057585, May 30, 2012 (3 pp.).
Axelsson, H. et al., Centrifuges, Sedimentation, pp. 1-6, Jul. 15, 2006 (6 pp.).
Schneider, D. et al., Deep Cut Vacuum Tower Incentives for Various Crudes, Stratus Engineering, Inc., pp. 1-21, Mar. 1997 (21 pp.).
U.S. Appl. No. 13/589,927, filed Aug. 20, 2012, Upgrading Hydrocarbon Material on Offshore Platforms.
U.S. Appl. No. 13/532,453, filed Jun. 25, 2012, Methods and Systems for Upgrading Hydrocarbon Residuum.
U.S. Appl. No. 12/816,844, filed Jun. 16, 2010, Dual Reactor for Better Conversion of Heavy Hydrocarbons.
U.S. Appl. No. 12/749,068, filed Mar. 29, 2010, Nozzle Reactor and Method of Use.
U.S. Appl. No. 12/695,885, filed Jan. 28, 2010, Methods for Preparing Solid Hydrocarbons for Cracking.
International Search Report, PCT/US2011/022206, Oct. 20, 2011 (3 pp.).

* cited by examiner

METHOD FOR MAKING BIOFUELS AND BIOLUBRICANTS

CROSS-REFERENCE TO RELATED PATENT APPLICATIONS

The entire contents of the following documents are incorporated by reference herein: U.S. Pat. No. 7,618,597, entitled "Nozzle Reactor and Method of Use," issued on 17 Nov. 2009 (the '597 patent), U.S. Patent Application Publication No. 2009/0266741, entitled "Nozzle Reactor and Method of Use," published on 29 Oct. 2009 (the '741 publication), U.S. patent application Ser. No. 12/816,844, entitled "Dual Reactor for Better Conversion of Heavy Hydrocarbons," filed on 16 Jun. 2010 (the '844 application), and ASTM D 6751. In the event of a conflict, the subject matter explicitly recited or shown herein controls over any subject matter incorporated by reference.

BACKGROUND

Interest in renewable energy sources has been steadily increasing due to high oil prices, peak oil concerns, climate change worries, and government incentives. One area of particular interest is in developing liquid biofuels to replace gasoline, diesel, jet fuel, and the like, used in conventional internal combustion engines. Another area of interest is in developing biolubricants to replace petroleum-based lubricants.

The most common process used to produce liquid biofuels is based on the transesterification of vegetable oil or animal fat feedstocks. In these processes, alkyl alcohols react with long chain fatty acids to produce mono alkyl esters of the long chain fatty acids. Methyl esters are commonly known by acronym FAME, which stands for Fatty Acid Methyl Ester. Ethyl esters are commonly known by the acronym FAEE, which stands for Fatty Acid Ethyl Ester. Ester based biofuels are sometimes referred to as "first generation" biofuels.

More recently, hydrogenation processes have been developed that convert vegetable oil or animal fat feedstocks into a higher quality biofuel that is more like conventional petroleum-based fuels. The biofuel is produced through hydrotreating, which is the same process that is already used in today's petroleum refineries.

Hydrotreating entails direct hydrogenation of the feedstock fatty acids or triglycerides in the presence of a catalyst to produce the corresponding alkane. The hydrogen replaces other atoms such as sulfur, oxygen, and nitrogen and converts the lipid molecules into paraffins and isoparaffins. The result is a hydrocarbon fuel that contains very little oxygen or sulfur. These biofuels are sometimes referred to as "second generation" or "synthetic" biofuels. They may also be known as non-esterified renewable biofuels.

Biolubricants may be produced using a transesterification process with a longer chain alkyl alcohol such as octyl alcohol. The resulting ester has lubricating properties that are similar to petroleum-based lubricants.

Biofuels and biolubricants provide a number of advantages over conventional petroleum-based materials. One of the principal advantages of these biomaterials is that they are renewable. Biofuels and biolubricants are derived from natural sources that are capable of being renewed over a relatively short time period such as a growing cycle for plants or a lifecycle for microorganisms. In contrast, petroleum-based materials are formed through geologic processes that take millions of years to renew.

Biofuels and biolubricants do not lead to carbon dioxide accumulation in the atmosphere. Carbon dioxide is extracted from the atmosphere by the source organisms as they grow and is returned to the atmosphere when the biofuels and biolubricants are burned or decompose. Unlike petroleum-based fuels, the overall impact is carbon neutral.

Biofuels and biolubricants are easy to use and require little or no additional infrastructure investment. Most biofuels and biolubricants can be distributed using conventional petroleum tanks and pumps and used in existing engines. In most applications, biofuels are mixed with petroleum based fuels to combine the advantages of both. Engines that operate on pure biofuels may require some minor modifications.

Many biofuels also reduce harmful emissions from combustion engines. Ester based biofuels contain additional oxygen that makes the biofuel burn more completely. This reduces the emission of unburned hydrocarbons, carbon monoxide, and/or particulate matter. Non-esterified biofuels can greatly boost cetane levels in diesel fuel. They can also dramatically reduce tailpipe emissions from conventional diesel engines. Biofuels also contain very little, if any, sulfur, which reduces the emission of sulfur dioxide, a significant cause of acid rain. The end result is cleaner air and a cleaner environment.

Ester based biofuels and biolubricants are non-toxic and biodegradable. The fatty acid esters readily degrade in the environment in a relatively short period of time. Ester based materials are also much less toxic than conventional petroleum-based fuels. These properties make ester based biofuels and biolubricants especially suitable for use in environmentally sensitive areas.

Ester based biofuels have a higher flash point than petroleum fuels making them safer to store and transport. For example, the flash point of biodiesel is greater than 130° C., which is significantly higher than the 64° C. flash point of petroleum diesel. The risk of inadvertently igniting ester based biofuels is much smaller than for conventional petroleum products.

Non-esterified biofuels offer some different advantages. One of the biggest advantages is that the hydrogenation processes do not produce any non-fuel coproducts. Another advantage is that non-esterified biofuel has a high cetane number (85 to 99) and the cloud point can be adjusted from −5° C. to −30° C. It also does not experience any storage stability problems.

Although biofuels and biolubricants have shown tremendous promise, there are still a number of obstacles preventing them from being adopted on a wider scale. One of the biggest problems is that the biofuels are produced using resources such as land and water that compete with food production. This is especially a problem when it comes to biodiesel production. The preferred source for producing biodiesel is vegetable oil because of its low free fatty acid content. However, this source competes directly with the food supply for arable land and water resources. Other sources that have higher amounts of free fatty acids are less desirable because they require pretreatment before they can be processed using conventional methods.

Conventional biodiesel production is primarily accomplished using the transesterification process. In this process, oil feedstock containing less than 4 wt % free fatty acids are mixed with methanol or ethanol in the presence of a basic catalyst such as potassium hydroxide. The fatty material in the oil feedstock reacts with the alcohol to produce biodiesel. If the feedstock contains more than 4 wt % free fatty acids, then it must be pretreated in an acid esterification process.

The hydrogenation process used to produce non-esterified biofuels needs to be integrated with an oil refinery to avoid the need to construct a dedicated hydrogenation production unit. If it is not part of a refinery, the required hydrogen stream makes the process uneconomical. However, limiting the process to refineries reduces its usefulness and potential since the expense of transporting the raw feedstocks to these limited locations is significant.

Another problem associated with conventional hydrogenation processes is that they are typically integrated with a hydrotreater to make use of the hydrogen that is already used in the refinery to remove sulfur. However, this reduces the volume of conventional fuels that can be processed through the hydrotreater.

Conventional hydrogenation processes also require a catalyst to successfully produce non-esterified biofuels. Unfortunately, the catalyst adds additional cost and complexity to the system.

SUMMARY

Disclosed below are representative embodiments that are not intended to be limiting in any way. Instead, the present disclosure is directed toward novel and nonobvious features, aspects, and equivalents of the embodiments of the methods described below. The disclosed features and aspects of the embodiments can be used alone or in various novel and nonobvious combinations and sub-combinations with one another.

A method for producing biofuels and biolubricants includes reacting lipid material with a motive fluid in a reactor. The reactor is configured to produce a high speed collision between the motive fluid and the lipid material. The collision produces tremendous mechanical forces that cleave the materials, generate radicals, and/or facilitate a variety of chemical reactions.

In one embodiment, the lipid material and the motive fluid pass through a first reactor and a second reactor positioned in series. The first reactor is configured to accelerate the motive fluid to supersonic speed and mix it with the lipid material. The second reactor provides additional mixing and residence time at high temperatures to further drive conversion of the lipid material to the desired reaction products. The residence time and linear velocity of the lipid material in the second reactor may be approximately 0.05 s to 1.5 s and approximately 4 to 40 m/s, respectively.

In one embodiment, the first reactor accelerates the motive fluid to at least Mach 1. This may be achieved by forcing the motive fluid through a constricted passage at high pressure. The first reactor may include a nozzle reactor. The second reactor may include a tubular reactor such as a coil reactor.

The lipid material may be obtained from any suitable renewable source such as algae, oil seeds, and the like. The lipid material typically includes fatty acid material in the form of free and/or esterified fatty acids. In some embodiments, it may be desirable to increase or maximize the amount of free fatty acids in the lipid material by, for example, hydrolyzing the esterified fatty acids. The lipid material may be part of a feedstock that includes other materials such as alcohols, e.g., alkyl alcohols.

The motive fluid may be any suitable fluid that is capable of reacting with the lipid material in the desired manner. The motive fluid functions as a hydrogen source and creates a hydrogen rich environment in which to react the lipid material. The motive fluid may be a single material or a mixture of multiple materials. Examples of suitable motive fluids include water (steam), natural gas, alcohols such as methanol, ethanol, and octynol, and paraffinic hydrocarbons.

The effluent from the second reactor may be separated to isolate a heavy fraction which is recycled back to the first reactor. The heavy fraction may have a boiling point of at least 250° C. The recycled material does not become hydrogen depleted by the harsh reaction conditions due to the hydrogen rich environment created by the motive fluid. This allows most, if not all, of the heavy fraction to be converted to the desired reaction products without generating undue amounts of coke.

Unlike conventional hydrotreating, the entire process may be operated without the use of a catalyst or added molecular hydrogen. This allows the process to be implemented separately from a refinery. The elimination of the catalyst makes the process simpler and more economical.

The process inputs and operating conditions may be adjusted to provide a variety of reaction products. For example, the process may be configured to produce conventional biofuels such as FAME and FAEE biodiesels. The process may also be configured to produce non-esterified renewable biofuels such as green diesel, green jet fuel, and green gasoline. The process may also produce fatty alcohols.

The foregoing and other features, utilities, and advantages of the subject matter described herein will be apparent from the following more particular description of certain embodiments as illustrated in the accompanying drawings.

The term "fatty acid material" refers to any lipid material that contains free or esterified fatty acids. The term "biofuel" refers to any fuel that is derived from living or recently living organisms. The term "biodiesel" refers to a fuel that includes primarily, if not entirely, mono-alkyl esters of long chain fatty acids derived from natural lipid material and meets the requirements of ASTM D 6751. The term "biolubricant" refers to a lubricant that includes primarily, if not entirely, mono-alkyl esters of long chain fatty acids derived from natural lipid material and has a higher viscosity than biodiesel (i.e., kinematic viscosity at 40° C. greater than 6.0 mm^2/sec). The term "fatty alcohol" refers to aliphatic alcohols derived from natural lipid material obtained from living or recently living organisms. All pressures are gauge unless stated otherwise.

The foregoing and other features, utilities, and advantages of the subject matter described herein will be apparent from the following more particular description of certain embodiments as illustrated in the accompanying drawings. In this regard, it is to be understood that the scope of the invention is to be determined by the claims as issued and not by whether given subject includes any or all features or aspects noted in this Summary or addresses any issues noted in the Background.

DRAWINGS

The preferred and other embodiments are disclosed in association with the accompanying drawings in which.

DETAILED DESCRIPTION

Figure 1:
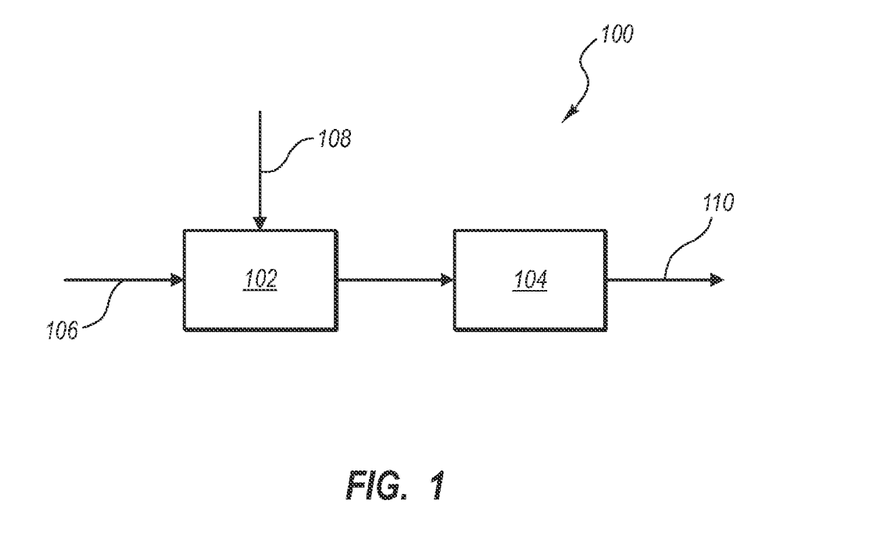
FIG. 1 is a schematic representation of one embodiment of a system for making biofuels and biolubricants.

An improved process for making biofuels and biolubricants includes reacting lipid material with a motive fluid. FIG. 1 shows one embodiment of a system 100 for producing biofuels and biolubricants. The system includes a first reactor 102 and a second reactor 104 positioned in series. The first reactor 102 accelerates the motive fluid to supersonic speed and mixes it with the lipid material. The second reactor 104 provides additional mixing and residence time at high temperature to further drive conversion of the lipid material to the desired reaction products. The second reactor 104 discharges an upgraded effluent material 110.

Lipid material is fed to the first reactor 102 in feedstock 106. A motive or cracking fluid 108 is also fed to the first reactor 102. The system 100 is fairly robust to changes in the composition of the feedstock 106 so it can process various types of lipid material without concern.

In one embodiment, the lipid material includes fatty acid material. The fatty acid material may include a combination of free and esterified fatty acids and the fatty acid chains may be saturated or unsaturated. For example, the feedstock 106 may be a lipid material that contains a wide variety of molecules. Any molecules that include one or more fatty acid chains are considered part of the fatty acid material in the lipid. Examples of fatty acid material include short and long chain free fatty acids, monoacylglycerols, diacylglycerols, triacylglycerols, and so forth. Any materials that do not include one or more fatty acid chains are not considered part of the fatty acid material.

Since the fatty acid material is one of the principal participants in the reactions, it is desirable to maximize the amount of fatty acid material in the feedstock 106. In one embodiment, the feedstock 106 includes approximately 30 wt % to 100 wt % fatty acid material. In another embodiment, the feedstock 106 may be entirely fatty acid material. For example, the feedstock 106 may be made up entirely of a combination of free fatty acids and triacylglycerols.

Although the feedstock 106 may contain any combination of fatty acid materials, it is preferable to increase or maximize the amount of free fatty acids. In one embodiment, the feedstock 106 may include at least 20 wt % free fatty acids, at least 35 wt % free fatty acids, or at least 45 wt % free fatty acids. In another embodiment, the feedstock 106 may be entirely or almost entirely free fatty acids.

The feedstock 106 may be obtained from any of a variety of sources. Suitable sources include plant-based fats and oils, animal-based fats and oils, algae and the like. Examples of plant-based fats and oils include palm oil, soybean oil, rapeseed oil, sunflower seed oil, peanut oil, cottonseed oil, palm kernel oil, jatropha oil, camelina oil, karanja oil, coconut oil, olive oil, corn oil, grape seed oil, hazelnut oil, linseed oil, rice bran oil, rubber seed oil, safflower oil, sesame oil, babassu oil, poppy seed oil, almond oil, walnut oil, avocado oil, tall oil, canola oil, cocoa butter, shea butter, butyrospermum, wheat germ oil, illipse butter, meadowform seed oil, borange seed oil, caster oil, vernoia oil, tung oil, jojoba oil, and ongokea oil. Examples of animal fats and oils include tallow animal fat, beef fat, pork fat, poultry fat and grease, lard, bone fat, milk fat, and the like.

Algae is one of the more attractive sources because it does not compete with the food supply for resources to the extent that some of the other sources do. Also, algae have the potential to produce 1,850 to 15,000 gallons of oil per acre of land used per year. This is substantially higher than vegetable oils such as corn oil (15 gal/ac/yr), soybean oil (48 gal/ac/yr), safflower oil (83 gal/ac/yr), sunflower oil (102 gal/ac/yr), rapeseed oil (127 gal/ac/yr), or palm oil (635 gal/ac/yr). Algae may contain 2 to 40 wt % lipid material.

Another factor that may be used to identify the most suitable source is the free fatty acid content of the material. Unlike conventional biodiesel processes where higher fatty acid content is undesirable, higher amounts of free fatty acids are preferred in the instant process. Algae oil is one the materials that has a relatively high quantity of free fatty acids at 4 to 15 wt %. Other materials that also have relatively high quantities of free fatty acids include palm fatty acid distillate (80 wt %), grease (10 to 50 wt %), rubber seed oil (25 wt %), tobacco oil (25 wt %), and crude palm oil (8 wt %).

Another attractive source that does not compete with the food supply is Jatropha curcas. This plant grows in tropical and subtropical regions. It can grow in wastelands and on almost any terrain, even on gravelly, sandy, and saline soils. The seeds of this plant can be crushed to produce a toxic, inedible vegetable oil. The seeds contain 27 to 40 wt % oil that can be extracted and processed. The free fatty acid content of the oil is relatively high at around 15 wt %.

In one embodiment, the feedstock 106 may include one or more of the following: palm fatty acid distillate (80 wt % free fatty acids), choice prime beef tallow (5 wt % free fatty acids), grease—house, white, yellow, brown (10 to 50 wt % free fatty acids), poultry fat, algae oil (4 to 15 wt % free fatty acids), inedible distillers dry grain oil, rubber seed oil (25 wt % free fatty acids), tobacco oil (25 wt % free fatty acids), crude palm oil (8 wt % free fatty acids), crude soybean oil (3 wt % free fatty acids), jatropha oil (3 wt % free fatty acids), camelina oil (3 wt % free fatty acids), karanja oil (3 wt % free fatty acids), and used cooking oil (2.5 wt % free fatty acids).

The motive fluid 108 may be any material that is capable of cracking the fatty acid material, reacting with the fatty acid material, or creating an environment that facilitates reactions with the fatty acid material. The motive fluid 108 should be capable of supplying hydrogen to the various reactions and/or creating a hydrogen enriched environment for the reactions.

Examples of suitable motive fluids 108 include steam, natural gas, paraffin and isoparaffin hydrocarbons such as ethane, propane, and butane, middle distillates (boiling point of 150° C. to 400° C.), alkyl alcohols, carbon dioxide, nitrogen, other gases, or combinations thereof. The motive fluid 108 may also include a quantity of aromatics, olefins, sulfur, and naphthenes. Preferred motive fluids 108 include superheated steam, natural gas, ethane, propane, methyl alcohol, ethyl alcohol, and/or combinations thereof.

The motive fluid 108 supplies hydrogen that reacts with the lipid material. The harsh conditions in the reactor strip the hydrogen from the host molecules so that it is available to react with the feedstock 106. For example, alkyl alcohols in the motive fluid 108 will decompose to produce hydrogen, carbon dioxide, and carbon monoxide, which will then react with the feed.

The elevated presence of hydrogen helps prevent the formation of coke in the system 100. The hydrogen from the motive fluid 108 is transferred to the heaviest hydrocarbons thereby preventing them from becoming hydrogen depleted in the extreme conditions of the reactors 102, 104.

The motive fluid 108 may be heated and pressurized before it is introduced to the first reactor 102. The heat and pressure give the motive fluid 108 energy that is transferred to the lipid material causing it to crack or scission. The motive fluid 108 may be provided in an amount and at a temperature sufficient to heat the feedstock 106 to the desired temperature and initiate the cracking reactions. The amount of heat provided by the motive fluid 108 may be determined using a mass and energy balance.

In one embodiment, one component of the motive fluid 108 may be used to heat another component of the motive fluid 108 to the desired temperature. For example, the motive fluid 108 may include a mixture of steam and natural gas. The steam may be superheated and used to heat the natural gas to the desired temperature either in a heat exchanger or by mixing them together.

In one embodiment, the motive fluid 108 may be pressurized to at least approximately 1000 kPa or at least approximately 2000 kPa. In another embodiment, the motive fluid 108 may be pressurized to approximately 1000 kPa to 6200 kPa or approximately 2000 kPa to 5170 kPa. In yet another embodiment, the motive fluid 108 may be pressurized no more than approximately 6200 kPa or no more than approximately 5170 kPa.

In one embodiment, the motive fluid 108 may be supplied at a temperature of at least approximately 300° C. or at least approximately 500° C. In another embodiment, the motive fluid 108 may be supplied at a temperature of approximately 300° C. to 760° C. or approximately 500° C. to 700° C. In yet another embodiment, the motive fluid 108 may be supplied at a temperature of no more than approximately 760° C. The motive fluid 108 may be supplied as a superheated fluid.

The feedstock 106 may be preheated before it enters the reactor 102 to a temperature that is just below the temperature at which the lipid material begins to react. This imparts the maximum amount of energy to the feedstock 106 without initiating any reactions, cracking or otherwise. In one embodiment the feedstock 106 may be heated to a temperature that is no more than 350° C. In another embodiment, the feedstock 106 may be heated to at least approximately 200° C. In yet another embodiment, the feedstock 106 may be heated to approximately 200° C. to 350° C.

The ratio of motive fluid 108 to feedstock 106 supplied to the first reactor 102 may vary depending on a number of factors. In general, it is desirable to minimize the amount of motive fluid 108 to reduce cost while still successfully reacting the lipid material. In one embodiment, the ratio of motive fluid 108 to feedstock 106 is no more than 2.0 or no more than 1.7. In another embodiment, the ratio of motive fluid 108 to feedstock 106 may be approximately 0.5 to 2.0 or approximately 1.0 to 1.7. In yet another embodiment, the ratio of motive fluid 108 to feedstock 106 is at least approximately 0.5 or at least approximately 1.0. In another embodiment, the ratio may be 20 to 0.05.

It should be appreciated that the first reactor 102 may be any suitable reactor capable of at least partially upgrading the lipid material. In one embodiment, the first reactor 102 is a nozzle reactor. A nozzle reactor includes any type of apparatus wherein differing types of materials are injected into an interior reactor chamber for the purpose of chemically and/or mechanically interacting with each other. A nozzle reactor often includes a constricted passage that accelerates the material that passes through it.

The nozzle reactor may have any of a number of suitable configurations. In one embodiment, the nozzle reactor accelerates the motive fluid 108 to supersonic velocities at which it collides with the lipid material. In this way, the nozzle reactor generates a tremendous amount of thermal and kinetic energy.

In one embodiment, the nozzle reactor is configured to accelerate the motive fluid to at least approximately Mach 1, at least approximately Mach 1.5, or, desirably, at least approximately Mach 2. In another embodiment, the nozzle reactor may accelerate the motive fluid to approximately Mach 1 to 7, approximately Mach 1.5 to 6, or, desirably, approximately Mach 2 to 5.

The reactions produced in the nozzle reactor are influenced by a number of factors such as temperature, residence time, pressure, and impact force. Without wishing to be bound by theory, it appears that the mechanical forces exerted on the fatty acid material due to the impact of the motive fluid is a significant factor in the success of the system 100. The impact force weakens the molecule making it more susceptible to chemical attack and/or directly cleaves it apart.

In one embodiment, the nozzle reactor is the same or substantially similar to the nozzle reactor disclosed in the '597 patent, the '741 publication, or the '844 application. The nozzle reactor may generally include an interior reactor chamber, an injection passage, and a material feed passage. The interior reactor chamber may have an injection end and an ejection end. The injection passage is positioned in fluid communication with the injection end of the interior reactor chamber.

The injection passage is roughly shaped like an hourglass with enlarged openings at the entrance (the enlarged volume injection section) and exit (the enlarged volume ejection section) and a constricted or narrowed area in the middle. The motive fluid 108 enters the nozzle reactor through the injection passage. The motive fluid 108 enters the injection passage at a material injection end and exits the passage at a material ejection end. The injection passage opens to the interior reactor chamber.

The lipid material enters the nozzle reactor through the material feed passage, which is in fluid communication with the interior reactor chamber and is generally located adjacent to the location where the motive fluid 108 exits the injection passage. Additionally, the feed passage is positioned transverse to the direction of the injection passage.

Figure 2:
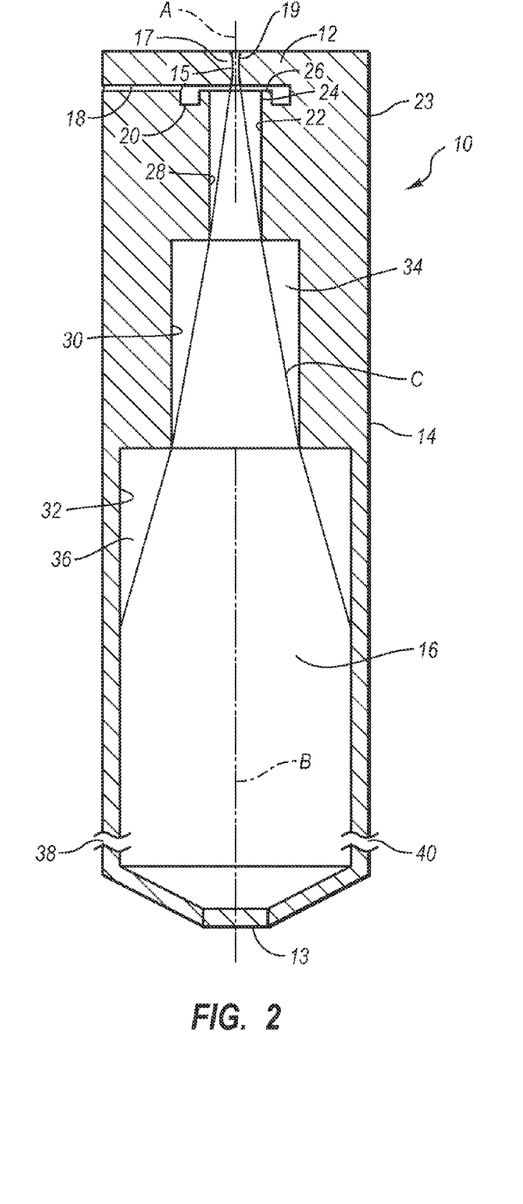
FIG. 2 shows an exemplary embodiment of a nozzle reactor that may be used in the system.

Turning to FIG. 2, an exemplary embodiment of a nozzle reactor 10 is shown. The nozzle reactor 10 includes a reactor body injection end 12, a reactor body 14 extending from the reactor body injection end 12, and an ejection port 13 in the reactor body 14 opposite its injection end 12. The reactor body injection end 12 includes an injection passage 15 extending into the interior reactor chamber 16 of the reactor body 14. The central axis A of the injection passage 15 is coaxial with the central axis B of the interior reactor chamber 16.

The injection passage 15 has a circular diametric cross-section and opposing inwardly curved side wall portions 17, 19 (i.e., curved inwardly toward the central axis A of the injection passage 15) extending along the axial length of the injection passage 15. In certain embodiments, the axially inwardly curved side wall portions 17, 19 of the injection passage 15 facilitate high speed injection of the motive fluid 108 as it passes through the injection passage 15 into the interior reactor chamber 16.

The side wall of the injection passage 15 can provide one or more of the following: (i) uniform axial acceleration of the motive fluid 108 passing through the injection passage 15; (ii) minimal radial acceleration of such material; (iii) a smooth finish; (iv) absence of sharp edges; and (v) absence of sudden or sharp changes in direction. The side wall configuration can render the injection passage 15 substantially isentropic.

A feed passage 18 extends from the exterior of the reactor body 14 toward the interior reaction chamber 16 transversely to the axis B of the interior reactor chamber 16. The feed passage 18 penetrates an annular feed port 20 adjacent the interior reactor chamber wall 22 at the interior reactor chamber injection end 24 abutting the reactor body injection end 12.

The feed port 20 includes an annular, radially extending reactor chamber feed slot 26 in fluid communication with the interior reactor chamber 16. The feed port 20 is thus configured to inject the feedstock 106: (i) at about a 90° angle to the axis of travel of the motive fluid 108 injected from the injection passage 15; (ii) around the entire circumference of a motive fluid 108 injected through the injection passage 15; and (iii) to impact the entire circumference of the motive fluid stream virtually immediately upon its emission from the injection passage 15 into the interior reactor chamber 16.

The annular feed port 20 may have a U-shaped or C-shaped cross-section among others. In certain embodiments, the annular feed port 20 may be open to the interior reactor chamber 16, with no arms or barrier in the path of fluid flow from the feed passage 18 toward the interior reactor chamber 16. The junction of the annular feed port 20 and the feed passage 18 can have a radiused cross-section.

The interior reactor chamber 16 may be bounded by stepped, telescoping side walls 28, 30, 32 extending along the axial length of the reactor body 14. In certain embodiments, the stepped side walls 28, 30, 32 are configured to: (i) allow a free jet of injected motive fluid 108 to travel generally along and within the conical jet path C generated by the injection passage 15 along the axis B of the interior reactor chamber 16, while (ii) reducing the size or involvement of back flow areas (e.g., 34, 36) outside the conical or expanding jet path C, thereby forcing increased contact between the high speed motive fluid stream within the conical jet path C and the feedstock 106 injected through the annular feed port 20.

As indicated by the drawing gaps 38, 40 in the embodiment of FIG. 2, the reactor body 14 has an axial length (along axis B) that is much greater than its width. In the embodiment shown in FIG. 2, exemplary length-to-width ratios are typically in the range of 2 to 7 or more.

The dimensions of the various components of the nozzle reactor shown in FIG. 2 are not limited, and may generally be adjusted based on the amount of feed flow rate. Table 1 provides exemplary dimensions for the various components of the nozzle reactor 10 based on the hydrocarbon input in barrels per day (BPD).

TABLE 1

Exemplary nozzle reactor specifications

| | Feed Input (BPD) | | |
|---|---|---|---|
| Nozzle Reactor Component (mm) | 5,000 | 10,000 | 20,000 |
| Injection passage entrance section diameter | 148 | 207 | 295 |
| Injection passage mid-section diameter | 50 | 70 | 101 |
| Injection passage exit section diameter | 105 | 147 | 210 |
| Injection passage length | 600 | 840 | 1,200 |
| Interior reaction chamber injection end diameter | 187 | 262 | 375 |
| Interior reaction chamber ejection end diameter | 1,231 | 1,435 | 1,821 |
| Interior reaction chamber length | 640 | 7,160 | 8,800 |
| Overall nozzle reactor length | 7,000 | 8,000 | 10,000 |
| Overall nozzle reactor outside diameter | 1,300 | 1,600 | 2,000 |
| Overall nozzle reactor length to outside diameter ratio | 5.4 | 5.0 | 5.0 |

The use of the nozzle reactor 10 to react the lipid material is described in greater detail. The feedstock 106 is injected into the interior reactor chamber 16 via the feed passage 18. The feedstock 106 may be pretreated prior to entering the nozzle reactor 10 to alter the amount or fraction of fatty acid material. The feedstock 106 may also be pretreated to alter other characteristics of the feed.

The feedstock 106 and the motive fluid 108 are simultaneously injected into the interior reactor chamber 16 through feed passage 18 and injection passage 15. The configuration of the injection passage 15 is such that the motive fluid 108 is accelerated to supersonic speed and enters the interior reactor chamber 16 at supersonic speed. The motive fluid 108 produces shock waves that facilitate mechanical and chemical scission of the lipid material as well as other chemical reactions involving the lipid material. In this manner, the lipid material may be reacted to form biofuels and biolubricants.

The nozzle reactor's conversion rate of lipid material into final products varies depending on the inputs, process conditions, and a number of other factors. In one embodiment, the conversion rate of the nozzle reactor 10 is at least approximately 2%, at least approximately 4%, or, desirably, at least approximately 8%. In another embodiment, the conversion rate of the nozzle reactor 10 is approximately 2% to 25%, approximately 4% to 20%, or, desirably, approximately 8% to 16%.

It should be appreciated that the second reactor 104 may be any suitable reactor capable of further reacting the lipid material. In one embodiment, the second reactor 104 is a tubular reactor. The tubular reactor may be any suitable reactor capable of converting the requisite amount of lipid material into biofuels and biolubricants. The tubular reactor provides enough residence time at high temperature and high velocity to provide the overall desired level of conversion of lipid material. The tubular reactor includes a tube that generally has a uniform internal diameter and may be linear or non-linear.

Figure 3:
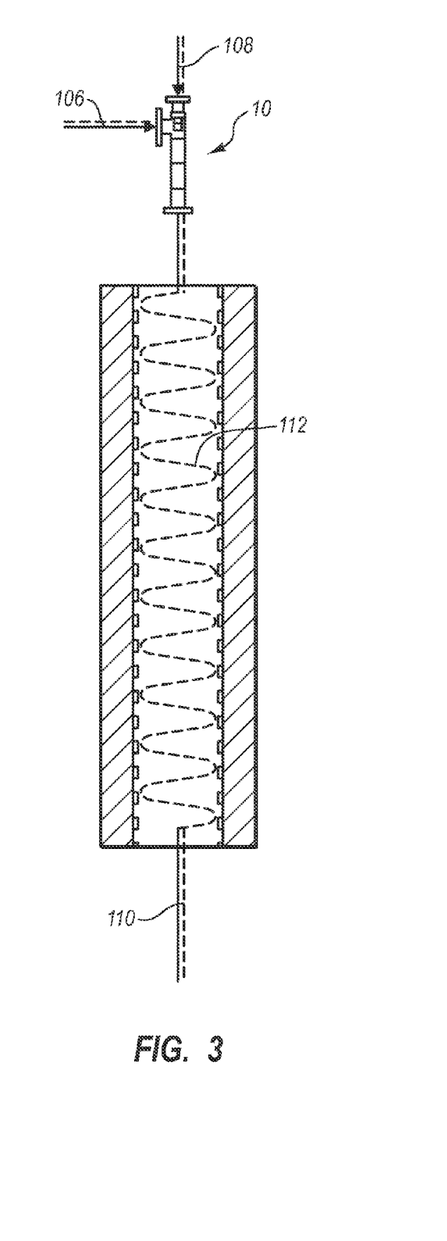
FIG. 3 shows an exemplary embodiment of a nozzle reactor coupled in series with a coil reactor.

In one embodiment, the tubular reactor may be a non-linear reactor such as the coil reactor 112 shown in FIG. 3. The non-linear shape of the coil reactor 112 forces the reactants to repeatedly change direction as they pass through the tube. This causes greater mixing and faster reaction time between the lipid material and the motive fluid 108.

The coil configuration affects the temperature and pressure distribution as well as the product yields. The coil reactor 112 is spiral shaped, but it should be appreciated that the coil reactor 112 may have any suitable non-linear shape. Other suitable shapes include a single row, split, reversed split, etc. Coil reactors typically increase the rate of conversion of fatty acid materials as well as the amount converted making this the preferred tubular reactor configuration for most situations.

As shown in FIG. 3, the feedstock 106 and cracking material 108 pass directly from the nozzle reactor 10 to the coil reactor 112. This quick transition allows the materials to enter the coil reactor 112 without losing too much heat or velocity. It should be appreciated, however, that the materials may undergo some form of processing or treatment after leaving the nozzle reactor 10 but before entering the coil reactor 112.

The lipid material is maintained at a temperature in the tubular reactor that is high enough to effectively react it, but not high enough to cause it to decompose. In one embodiment, the temperature is at least approximately 350° C. or at least approximately 420° C. In another embodiment, the temperature may be approximately 350° C. to 460° C. or approximately 380° C. to 440° C. In yet another embodiment, the temperature may be no more than approximately 460° C. or no more than approximately 480° C.

In most situations it is not necessary to heat the tubular reactor. Large scale implementations should not require additional heat since the energy imparted to the feedstock 106 and the motive fluid 108 before entering the system 100 is sufficient to achieve the desired conversion. However, if the material throughput is small relative to the size of the reactor tube, energy losses due to heat dissipation may be more acute. In these circumstances, it may be desirable to heat the reactor tube to maintain the desired conversion and/or product yields.

The residence time and linear velocity of the lipid material in the tubular reactor may be adjusted as necessary to provide the desired conversion rate and product characteristics. In one embodiment, the residence time is at least approximately 0.05 s, at least approximately 0.10 s, or, desirably, at least approximately 0.15 s. In another embodiment, the residence time is approximately 0.05 s to 1.5 s, approximately 0.10 s to 0.8 s, or, desirably, approximately 0.15 s to 0.7 s. In yet another embodiment, the residence time is no more than approximately 1.5 s, no more than approximately 0.8 s, or, desirably, no more than approximately 0.7 s.

The linear velocity of the lipid material in the tubular reactor may be at least approximately 4 m/s, at least approximately 5 m/s, or, desirably, at least approximately 6 m/s. In another embodiment, the linear velocity is approximately 4 to 40 m/s, approximately 5 to 35 m/s, or, desirably 4 to 32 m/s. In yet another embodiment, the linear velocity is no more than approximately 40 m/s, no more than approximately 35 m/s, or, desirably, no more than approximately 32 m/s.

The pressure in the tubular reactor may vary as required to sustain the desired reactions. In one embodiment, the tubular reactor may be at a pressure of approximately −34 kPa to 240 kPa or approximately −34 kPa to 140 kPa.

The size and dimensions of the tubular reactor are determined based on the capacity of the system. Higher flow rates will require a larger reactor and vice versa. The tubular reactor may be made of any suitable material such as metal, composites, and so forth. In one embodiment, the tubular reactor is made of SS-316.

The total residence time of the lipid material in the nozzle reactor and the tubular reactor may vary widely. In one embodiment, the total residence time is at least approximately 0.2 s or at least approximately 0.3 s. In another embodiment, the total residence time is approximately 0.2 s to 2 s or approximately 0.3 s to 1.2 s. In yet another embodiment, the residence time is no more than approximately 2 s or no more than approximately 1.8 s.

The system 100 reacts the lipid material with the motive fluid 108 to produce biofuels and biolubricants. The various parameters of the system 100 may be adjusted to yield different reaction products. Examples of such parameters include operating conditions such as the pressure, temperature, relative mass flows of the feedstock 106 and the motive fluid 108, and the like. They also include the composition of the feedstock 106 and the motive fluid 108.

In one embodiment, the system 100 may be configured to produce esterified biofuels and biolubricants. The feedstock 106 may include combination of lipid material and alkyl alcohols such as methyl alcohol, ethyl alcohol, and octyl alcohol. The motive fluid 108 may include steam and/or natural gas. The conditions in the reactors, 102, 104 may be such that the fatty acids in the lipid material undergo an esterification reaction with the alkyl alcohols to produce biodiesel (methyl and ethyl esters) and biolubricants (octyl esters).

The fatty acid material may react in one or more of the following ways depending on the circumstances. A portion of the free fatty acids in the fatty acid material may undergo a reduction reaction with hydrogen to form fatty alcohols and water. Some of the remaining free fatty acids may undergo an esterification reaction with the fatty alcohols to produce fatty acid esters. The fatty acid esters may react with hydrogen to produce more fatty alcohols. The fatty alcohols produced above may subsequently undergo a dehydration reaction and subsequent hydrogenation reaction to produce a saturated paraffinic hydrocarbon and water.

In another embodiment, the system 100 may be configured to produce non-esterified renewable biofuels such as green diesel (C12-C18 paraffins and isoparaffins), green jet fuel (C8-C16 hydrocarbons), and green gasoline. In this embodiment, the feedstock 106 may include lipid materials obtained from renewable sources. The motive fluid 108 may include steam and/or natural gas to produce a highly reactive, hydrogen rich environment. The conditions in the reactors 102, 104 may be such that the fatty acids in the lipid material undergo mild cracking, hydrodeoxygenation, decarboxylation, and hydroisomerization to produce paraffinic and branched hydrocarbon biofuels.

The lipid material may be cracked or cleaved apart by the impact of the high speed motive fluid 108 as both materials are fed into the reactor 102. The extent to which the lipid material is cracked and isomerized may be controlled to produce the most desirable mixture of reaction products. For example, the quality of the green diesel produced may be adjusted by controlling the amount of isomerization of the paraffins. In one embodiment, the extent of cracking and/or isomerization of the fatty acid material may be controlled by adjusting the temperature of the motive fluid 108 and/or the residence time in the reactors 102, 104.

When the fatty acid material is cracked and a bond is broken, the radical positions immediately react with hydroxide or hydrogen radicals that are abundantly available in the reaction environment. This results in the production of alcohols and paraffins. Paraffins (produced by the cracking process or by other reactions) may undergo isomerization in the hydrogen environment. In this way, the system 100 may facilitate hydrocracking and hydroisomerization of the fatty acid material.

The fatty acid material may also be partially or fully hydrogenated in the reactors 102, 104. In one embodiment, all of the double and higher order bonds in the fatty acid material are fully saturated. This may also include any higher order bonds formed by intermediate reaction products.

In one embodiment, the system produces the products shown in Table 2.

TABLE 2

Reaction Products

| Products | |
|---|---|
| LPG (vol %) | 8-8.6 |
| Naphtha (vol %) | 1-16 |
| Diesel (vol %) | 84-99 |
| Cetane number | >75 |
| Sulfur (ppm) | <1 |

The non-esterified biofuels may have similar properties to those produced using hydrotreating processes. For example, the pour point of green diesel—the lowest temperature at which the material will begin to flow—may be approximately −34° C. to −12° C. (ASTM D 97). The cloud point—the temperature at which dissolved solids, such as wax crystals, begin to precipitate—may be approximately −29° C. to −12° C. The cloud point may be adjusted by altering the iso/normal ratio of the paraffins (higher ratio gives lower cloud point and vice versa). The cetane number may be greater than the original feedstock and may be 70 to 90.

In an exemplary embodiment, the green diesel may have the following properties:

TABLE 3

Green Diesel Properties

| Products | |
| --- | --- |
| Density at 15° C. (kg/m^3) | 775 to 785 |
| Viscosity at 40° C. (mm^2/s) | 2.5 to 3.5 |
| Cetane number | 80 to 90 |
| Distillation range (° C.) | 180 to 320 |
| Cloud point (° C.) | −5 to −25 |
| Pour point (° C.) | −5 to −30 |
| Heating value, lower (MJ/kg) | 44.0 |
| Total aromatics (wt %) | 0 |
| Polyaromatics (wt %) | 0 |
| Oxygen content (wt %) | 0 |
| Sulfur (mg/kg) | <10 |
| Lubricity HFRR at 60° C. (μm) | <460 |
| Storage stability | Good |

In an exemplary embodiment, the green jet fuel may have the following properties:

TABLE 4

Green Jet Fuel Properties

| Jet A1 | |
| --- | --- |
| Density at 15° C. (kg/m^3) | 775 to 840 |
| Distillation range (° C.) | 200-300 |
| Heating value, lower (MJ/kg) | 42.8-44.0 |

The system 100 may provide a much higher conversion rate than other comparable systems. The conversion rate of lipid material into distillates in the system 100 varies depending on the inputs, conditions, and a number of other factors. In one embodiment, the single pass conversion rate of the system 100 is at least approximately 15%, at least approximately 35%, or, desirably, at least approximately 45%.

One advantage of the system 100 is that it produces very little, if any, coke and minimizes the amount of gas generated. This makes it possible to operate the system 100 for long periods of time without cleaning. In one embodiment, the system 100 may be operated indefinitely. Minimizing coke production also means that more of the lipid material is conserved so that it can be used to produce higher value products.

It should be appreciated that some portion of feedstock 106 may pass through the system 100 without reacting. This material may be referred to as non-participating lipid material since it did not react to produce biofuels and/or biolubricants. Lipid material that reacts but still does not produce the desired reaction products may also be referred to as non-participating fatty acid material.

The effluent material 110 from the system 100 may be transported to a separation unit that separates it into its constituent fractions. The separation unit may be any suitable separator capable of separating the effluent material 110. Examples of suitable separation units include, but are not limited to, atmospheric or vacuum distillation units, gravity separation units, filtration units, and cyclonic separation units.

The system 100 may produce a small amount of fuel gas (methane, ethane, propane, and butane). The fuel gas and water may be separated from the other reaction products in the separation unit. For example, the effluent material 110 from the reactor 104 may be processed through a distillation column to separate the fuel gas and water from the biofuels and biolubricants.

Figure 4:
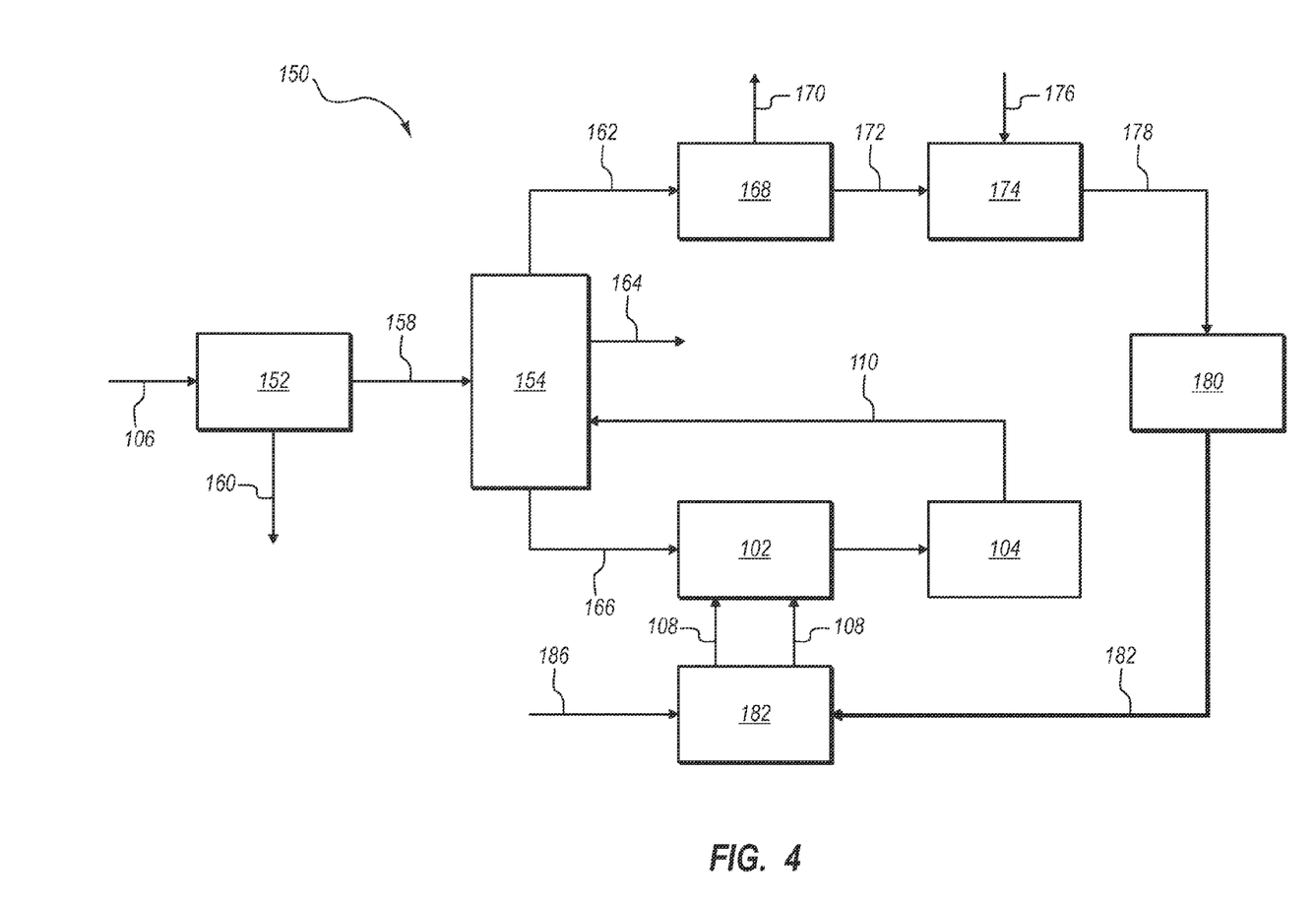
FIG. 4 is a schematic representation of another embodiment of a system for making biofuels and biolubricants using the system shown in FIG. 1.

Turning to FIG. 4, another embodiment of a system 150 for producing biofuels and biolubricants is shown. The system 150 includes the reactors 102, 104 as well as a hydrolysis system 152 and a separation unit 154. These components operate as follows.

The feedstock 106 initially enters the hydrolysis system 152 as depicted in FIG. 4. The hydrolysis system 152 is used to increase the free fatty acid content in the feedstock 106 by hydrolyzing the esterified fatty acids in the feedstock 106. For example, triacylglycerols are hydrolyzed to produce free fatty acids, glycerol, and water. The free fatty acids 158 are separated from the other materials and continue on to the separation unit 154. The water and alcohols 160 may be collected and sold or processed further to produce higher value products.

In one embodiment, the glycerol produced by the hydrolysis system 152 may be aromatized to gasoline range alkylaromatics or jet fuel range mono alkyl aromatics using deoxygenation-oligomerization-hydrogenation reaction path at temperatures above 400° C. The glycerol undergoes dehydration, aldol condensation, and aromatization reactions. There is some alcohol formation as well as some other oxygenates. Hydrogenation does not occur as a major reaction, but it is significant enough to reduce coking.

The hydrolysis process used in the hydrolysis system 152 is well known in industry. The process involves reacting esterified fatty acids with water or steam at an elevated pressure and temperature (245 to 255° C.). The elevated temperature of the process facilitates adequate mixing of the aqueous phase in the lipid material so that physical agitation may be unnecessary.

The separation unit 154 may be any suitable separator. In one embodiment, the separation unit is distillation column that is operated at atmospheric pressure. The separation unit 154 receives material from two sources: (1) the free fatty acid enriched feedstock 158 and (2) the effluent material from the reactor 104. The separation unit 154 outputs gases 162, reaction products 164 and a heavy fraction 166.

The enriched feedstock 158 may be processed in the separation unit 154 before entering the reactor 102 to separate out any gases 162 or distillate products 164 that may be present. The separation unit 154 may also serve to preheat the feedstock 158 before it enters the reactor 102.

The gases 162 include fuel gases such as methane, ethane, propane, and butane as well as water vapor. The water is separated from the fuel gases at condenser 168. The fuel gases 170 exit the condenser and are collected to be used as a fuel source for the system 150 or flared. The water 172 enters a water treatment system 174 where make-up water 176 is added as needed. The treated water 178 exits the water treatment system 174 and enters a boiler 180. The boiler 180 heats the water to superheated steam 182 that is fed into the reactor 102. The superheated steam 182 may pass through a heat exchanger 184 to heat the other components 186 of the motive fluid 108, such as natural gas, to temperature before they enter the reactor 102.

The reaction products 164 include biofuel and biolubricant distillates. The distillates may have different boiling points than the lipid material in the enriched feedstock 158 making it relatively easy to separate them from each other. The distillate products 164 may be separated further into different products such as biodiesel (boiling point up to 377° C.), biolubricants (boiling point up to 400° C.), non-esterified biofuels such as green diesel, green jet fuel, and green gasoline, and so forth.

The heavy fraction 166 is drawn off the bottom of the separation unit 154 and fed into the reactor 102. The heavy fraction 166 includes most, if not all, of the lipid material that entered in the enriched feedstock 158. The heavy fraction for biodiesel production may have a boiling point of at least 250° C.

The motive fluid 108 may be a combination of superheated steam 182 and other components 186 such as natural gas or any of the components mentioned previously. As already mentioned above, the steam 182 may be used to preheat the other components 186 in the heat exchanger 184. It should be appreciated that in alternative embodiments the motive fluid 108 may be made of a single component and may not be preheated.

The effluent material 110 from the reactor 104 includes non-participating lipid material, distillate products 164, and gases 162. The effluent material 110 is separated into these fractions in the separation unit 154. One of the advantages of this embodiment is that the heavy fraction of the effluent material 110 (material having a boiling point of at least 250° C.) may be separated and recycled back to the first reactor 102. The heavy fraction can be recycled back in perpetuity because the hydrogen supplied by the motive fluid 108 minimizes or prevents the heavier molecules from degrading and forming coke in the reactors 102, 104.

The system 150 may provide a significantly higher conversion rate than other comparable systems. The conversion rate of lipid material into biofuels and biolubricants in the system 150 varies depending on the inputs, conditions, and a number of other factors. In one embodiment, the conversion rate of lipid material in the system 150 may be at least approximately 65%, at least approximately 75%, or, desirably, at least approximately 80%. In another embodiment, most or at least substantially all of the lipid material that enters the system 150 is converted to biofuels, biolubricants, or fuel gases. The amount of non-participating lipid material and/or coke left over from the process may be minor.

One advantage of the systems 100, 150 is that the reactions take place without the use of a catalyst or added elemental hydrogen. This significantly simplifies and reduces the cost of the process. The systems 100, 150 may also be implemented without being part of a refinery. This allows much greater flexibility in deciding where to site the system 100.

It should be appreciated that the system 150 may be modified in any of a number of ways. For example, the enriched feedstock 158 may enter the first reactor 102 without going through a separation step. The system 150 may also include multiple stages of reactors 102, 104 positioned in series. The effluent from each stage may be separated and the heavy fraction may continue on to the next stage. Numerous other configurations are possible.

Figure 5:
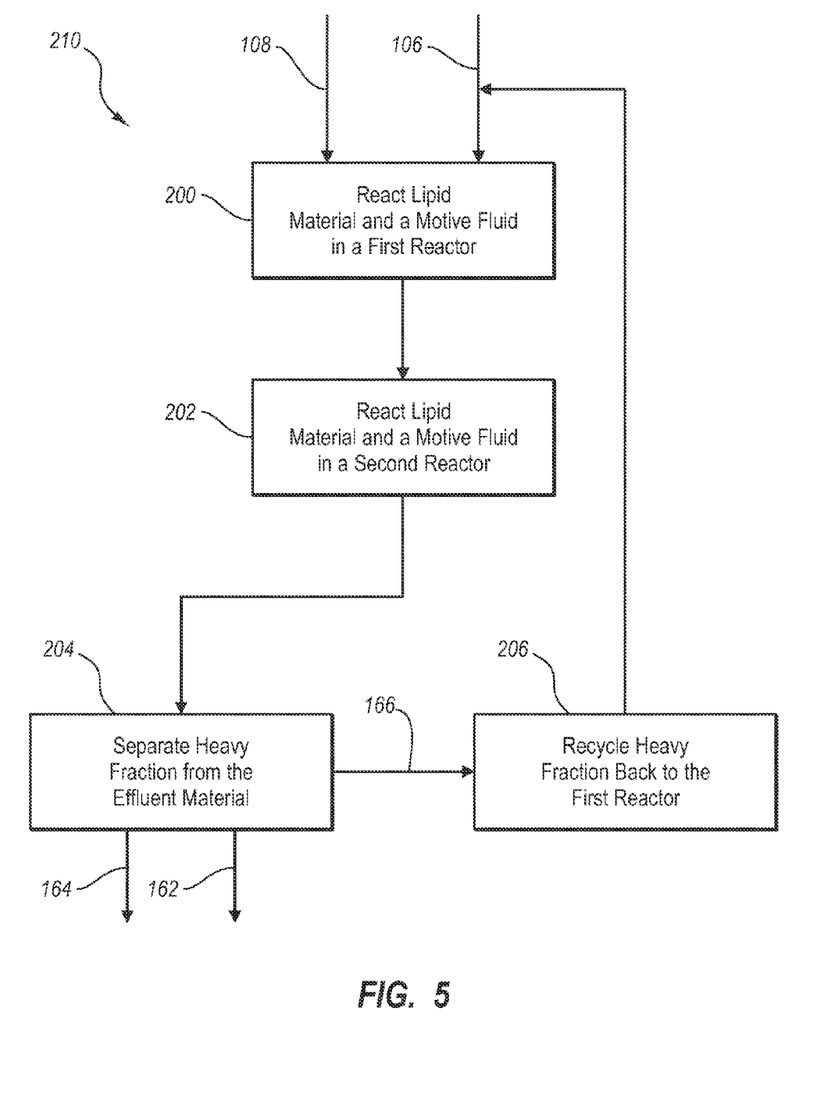
FIG. 5 shows one embodiment of a method for producing biofuels and biolubricants.

A method 210 for producing biofuels and biolubricants from lipid material is shown in FIG. 5. The method 210 includes the step 200 of reacting the lipid material and the motive fluid 108 in the first reactor 102 to form a first effluent material. At step 202, the first effluent material is reacted in the second reactor 104 to form a second effluent material. In one embodiment, the first effluent is discharged directly from the first reactor 102 to the second reactor 104 without undergoing any intermediate processing or storage.

The second effluent material is separated at step 204 to isolate the heavy fraction 266 from distillates 164 and gas 162. The heavy fraction 266 is then recycled back to the first reactor 102. In some embodiments the separation and recycling step may be skipped in favor of sending the effluent on for further processing (e.g., catalytic cracking, hydro-cracking, etc.).

Figure 6:
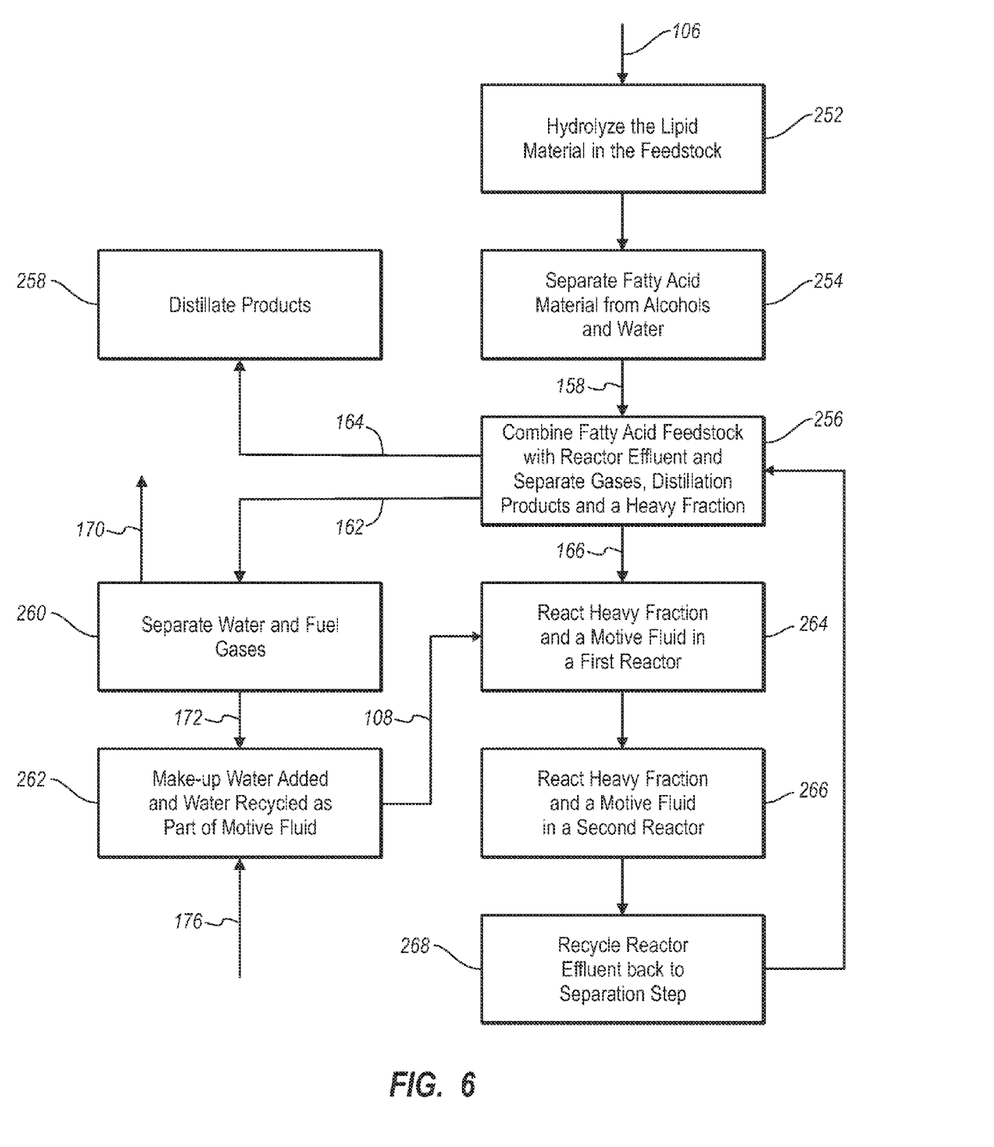
FIG. 6 shows another embodiment of a method for producing biofuels and biolubricants.

FIG. 6 shows another method 250 for producing biofuels and biolubricants from fatty acid material. The method 250 includes the step 252 of hydrolyzing lipid material in the feedstock 106 to produce free fatty acids, water, and alcohol. The free fatty acids are separated from the water and alcohol at step 254. The free fatty acid enriched feedstock 158 is then combined with the effluent from the second reactor 104 at step 256. The resulting mixture is separated to isolate gases 162, distillate products 164, and a heavy fraction 166. The distillate products 164 are collected for sale or further processing at step 258.

The gases 162 are separated at step 260 to isolate water from the fuel gases 170. The recovered water 172 is then treated at step 262 so it can be used as part of the motive fluid 108. The water may be condensed at step 262 to separate it from the fuel gases 170. Make-up water 176 may be added and the water may be heated to superheated steam in preparation for it to be injected into the first reactor 102.

The heavy fraction 166 obtained at step 256 is reacted with the motive fluid 108 in a first reactor at step 264 and then again in a second reactor at step 266. Steps 264 and 266 are similar to steps 200 and 202 described in connection with FIG. 5. At step 268, the effluent from the second reactor is recycled back to step 256 where it is combined with the enriched feedstock 158 in a separation unit. The process repeats itself from here.

The terms recited in the claims should be given their ordinary and customary meaning as determined by reference to relevant entries (e.g., definition of "plane" as a carpenter's tool would not be relevant to the use of the term "plane" when used to refer to an airplane, etc.) in dictionaries (e.g., widely used general reference dictionaries and/or relevant technical dictionaries), commonly understood meanings by those in the art, etc., with the understanding that the broadest meaning imparted by any one or combination of these sources should be given to the claim terms (e.g., two or more relevant dictionary entries should be combined to provide the broadest meaning of the combination of entries, etc.) subject only to the following exceptions: (a) if a term is used herein in a manner more expansive than its ordinary and customary meaning, the term should be given its ordinary and customary meaning plus the additional expansive meaning, or (b) if a term has been explicitly defined to have a different meaning by reciting the term followed by the phrase "as used herein shall mean" or similar language (e.g., "herein this term means," "as defined herein," "for the purposes of this disclosure [the term] shall mean," etc.). References to specific examples, use of "i.e.," use of the word "invention," etc., are not meant to invoke exception (b) or otherwise restrict the scope of the recited claim terms. Other than situations where exception (b) applies, nothing contained herein should be considered a disclaimer or disavowal of claim scope. The subject matter recited in the claims is not coextensive with and should not be interpreted to be coextensive with any particular embodiment, feature, or combination of features shown herein. This is true even if only a single embodiment of the particular feature or combination of features is illustrated and described herein. Thus, the appended claims should be read to be given their broadest interpretation in view of the prior art and the ordinary meaning of the claim terms.

As used herein, spatial or directional terms, such as "left," "right," "front," "back," and the like, relate to the subject matter as it is shown in the drawing FIGS. However, it is to be understood that the subject matter described herein may assume various alternative orientations and, accordingly, such terms are not to be considered as limiting. Furthermore, as used herein (i.e., in the claims and the specification), articles such as "the," "a," and "an" can connote the singular or plural. Also, as used herein, the word "or" when used without a preceding "either" (or other similar language indicating that "or" is unequivocally meant to be exclusive—e.g., only one of x or y, etc.) shall be interpreted to be inclusive (e.g., "x or y" means one or both x or y). Likewise, as used herein, the term "and/or" shall also be interpreted to be inclusive (e.g., "x and/or y" means one or both x or y). In situations where "and/or" or "or" are used as a conjunction for a group of three or more items, the group should be interpreted to include one item alone, all of the items together, or any combination or number of the items. Moreover, terms used in the specification and claims such as have, having, include, and including should be construed to be synonymous with the terms comprise and comprising.

Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

What is claimed is:

1. A method comprising accelerating a motive fluid to at least Mach 1 in a reactor and producing a high speed motive fluid; and reacting a feedstock that includes lipid material with the high speed motive fluid in the reactor to produce reaction products comprising a biofuel, a biolubricant, or a combination thereof.

2. The method of claim 1 wherein the reactor is a nozzle reactor.

3. The method of claim 1 wherein accelerating the motive fluid to at least Mach 1 comprises moving the motive fluid through a constricted passage in the reactor.

4. The method of claim 1 wherein the method further comprises discharging an effluent material from the reactor and reacting the effluent material in a tubular reactor.

5. The method of claim 1 wherein the feedstock includes at least 20 wt % fatty acid material.

6. The method of claim 1 wherein the feedstock includes alcohol.

7. The method of claim 1 wherein the motive fluid includes steam, natural gas, or a combination thereof.

8. The method of claim 1 wherein the reaction products include mono-alkyl esters of fatty acids, fatty alcohols, or a combination thereof.

9. The method of claim 1 wherein the reaction products includes paraffinic and branched hydrocarbons.

10. The method of claim 1 wherein at least 70% of the lipid material reacts and forms the reaction products, wherein the reaction products includes fatty acid esters, fatty alcohols, paraffinic and branched hydrocarbons, or combinations thereof.

11. The method of claim 1 comprising hydrolyzing the lipid material and producing free fatty acids, wherein the feedstock includes the free fatty acids.

12. The method of claim 11 wherein the hydrolyzing the lipid material further produces glycerol, the method comprising separating the glycerol from the free fatty acids and reacting the glycerol and producing alkyl-aromatics.

13. The method of claim 1 comprising recycling a heavy fraction of an effluent material from the reactor back through the reactor.

14. The method of claim 1 wherein the feedstock is deoxygenated in the reactor, isomerized in the reactor, cracked in the reactor, or combinations thereof.

* * * * *